United States Patent [19]
Mori

[11] Patent Number: 4,879,655
[45] Date of Patent: Nov. 7, 1989

[54] CONSTANT SPEED CRUISING CONTROL APPARATUS

[75] Inventor: Akihiko Mori, Himeji, Japan

[73] Assignee: Mitsubishi Denki Kabushiki Kaisha, Tokyo, Japan

[21] Appl. No.: 177,327

[22] Filed: Apr. 4, 1988

[30] Foreign Application Priority Data

Apr. 15, 1987 [JP] Japan .................................. 62-93526

[51] Int. Cl.$^4$ ............................................ B60K 41/00
[52] U.S. Cl. .......................... 364/426.04; 364/431.07; 180/179; 123/352
[58] Field of Search ....................... 364/426.04, 431.07, 364/424.1; 74/866; 123/352; 180/176, 179

[56] References Cited

U.S. PATENT DOCUMENTS

| | | | |
|---|---|---|---|
| 4,202,424 | 5/1980 | Sakakibara et al. | 180/176 |
| 4,463,822 | 8/1984 | Tanigawa et al. | 180/179 |
| 4,535,864 | 8/1985 | Tanigawa et al. | 180/179 |
| 4,560,024 | 12/1985 | Noda et al. | 180/176 |

*Primary Examiner*—Gary Chin
*Attorney, Agent, or Firm*—Oblon, Spivak, McClelland, Maier & Neustadt

[57] ABSTRACT

A constant speed cruising control apparatus includes an overdrive controller for controlling the overdrive position of an automatic speed changer, as well as an overdrive switch for the automatic speed changer. In order to prevent a shock in the drive line, the throttle is controlled so as to reduce the driving force to the vehicle during predetermined times after the overdrive is engaged or cancelled.

2 Claims, 8 Drawing Sheets

CONSTANT SPEED CRUISING CONTROL APPARATUS

BACKGROUND OF THE INVENTION

1. Field of the Invention

The present invention relates to a constant speed cruising control apparatus for an automobile for keeping cruising speed for the automobile.

2. Discussion of Background

Figure 6:
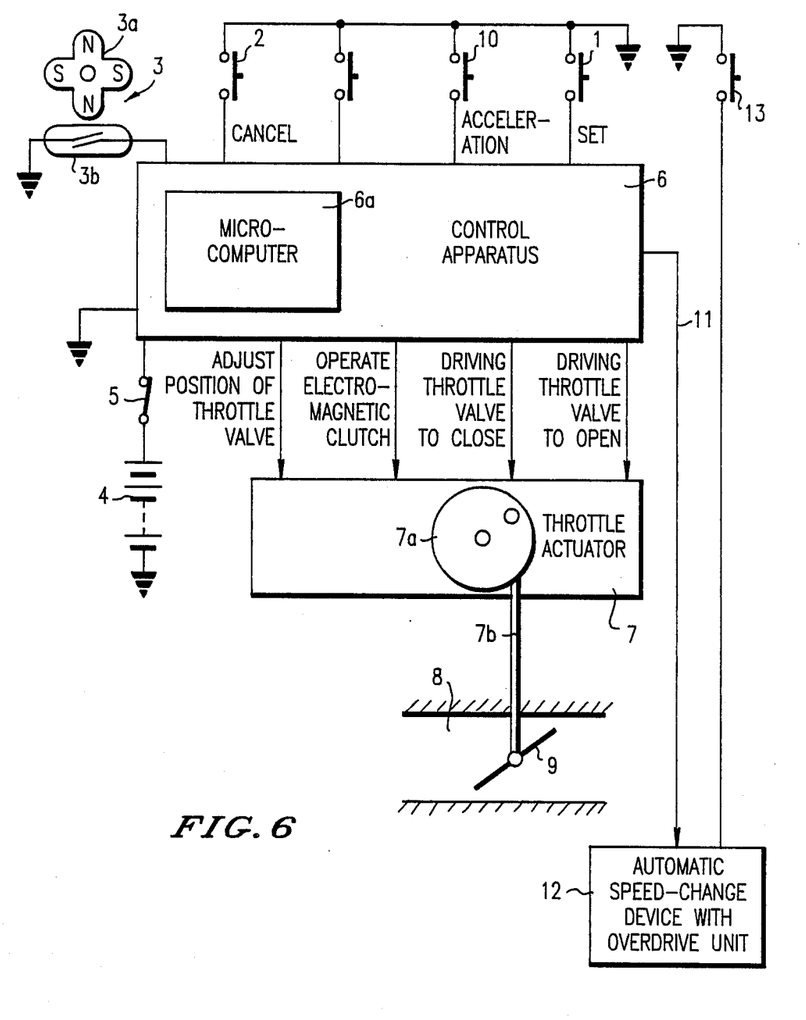
FIG. 6 is a diagram showing a conventional control apparatus.

FIG. 6 is a diagram of a conventional constant speed cruising control apparatus for an automobile disclosed in, for instance, Japanese Unexamined Patent Publication 39311/1983.

In FIG. 6, a reference numeral 1 designates a set switch for instructing the start of constant speed cruising by a driver, a numeral 2 designates a cancel switch actuated by operating a braking device (not shown) to release the constant speed cruising, a numeral 3 designates a car speed sensor to detect the cruising speed of the automobile, which is constituted by a rotating body 3a having four magnetic poles rotated by a meter cable (not shown) for transmitting revolution of a transmission unit (not shown) and a read switch 3b and which is adapted to output pulse signals having a frequency in proportion to the cruising speed, a numeral 4 designates a battery for an automobile, a numeral 5 designates a main switch as a power source switch for supplying electric power in the battery 4, and a numeral 6 designates a control unit which includes a processing circuit 6a such as a microcomputer and which is operated by closing the main switch 5. The processing circuit 6a is adapted to receive signals from the set switch 1, the cancel switch 2 and the car speed sensor 3, and to perform processing operations for automatic control to coincide the actural cruising speed Vs with a target speed Vr to thereby output various control signals.

A motor-driven type throttle actuator 7 is provided in the intake air conduct 8 for the engine (not shown), which is adapted to receive the various control signals from the control unit 6 and to drive to open and close a throttle valve 9 in association with an accelerator pedal (not shown). The driving of the throttle valve 9 is performed through a wire 7b and a link 7a connected to a motor (not shown). An angle of rotation of the link 7a corresponding to the degree of opening of the throttle valve 9 is detected by a potentiometer (not shown) and the value of the angle is supplied to the control unit 6 as a signal indicative of the position of the throttle valve. The link 7a is connected to the motor through an electromagnetic clutch (not shown) and they are connected or disconnected by an electromagnetic crutch singal from the control unit 6.

The operation of the conventional constant speed cruising control apparatus having the above-mentioned construction will be described.

When a driver operates the main switch 5 to supply an electric power from the car battery 4 to the control unit 6, the control unit 6 is actuated to operate the output of the car sensor 3. The car sensor 3 outputs a train of pulse signals having a frequency in proportion to the actual car speed Vs during the cruising. The frequency of the pulses is measured by the control unit 6 to obtain the value of the cruising speed Vs. In the cruising, when the driver operates the set switch 1, a signal is supplied to the control unit 6, so that the cruising speed is stored as a target speed Vr in the control unit, and control of constant speed cruising or the car is initiated.

The actual cruising speed Vs of the automobile is measured periodically, and the signals indicative of the cruising speed Vs are compared with the target speed Vr in the control unit so that control signals are outputted to the throttle actuator 7 to adjust the degree of opening of the throttle valve 9, whereby the automobile runs at the target speed Vr. Namely, when the actual cruising speed Vs is lower than the target speed Vr, the throttle valve is opened by an amount to be required by a driving signal to open the throttle valve. Contrary, when the actual cruising speed Vs is higher than the target speed Vr, control of the throttle valve 9 is made to close it by an amount required. Thus, the automobile runs at a constant speed without operating the accelerator pedal by the driver.

When the driver operates a braking device while the control of the constant speed cruising is carried out, the cancel switch 2 is actuated, and a signal for releasing the constant speed cruising is supplied to the control unit 6. On receiving the signal, the control unit 6 immediately outputs a signal to disconnect the electromagnetic, clutch to the throttle actuator 7 to thereby release the electromagnetic clutch. After that, the driver adjusts the degree of opening of the throttle valve 9 by operating the accelerator pedal to control the cruising speed of the automobile.

On the other hand, when an automatic speed-changing device with an overdrive unit 12 is mounted on the automobile, and the automobile is on an uphill load under the constant speed cruising control, it is difficult to maintain the target speed Vr, and an overdrive cruising prohibiting signal 11 is outputted from the control unit 6 to the automatic speed-changing device 12.

Similarly, the overdrive cruising prohibiting signal 11 is outputted when an acceleration switch 10 is continuously operated beyond a predetermined time.

A numeral 13 designates a switch for changing an overdrive cruising prohibiting operation to a cruising operation and vice versa. The switch 13 allows the above-mentioned operation only when it permits the overdriving of the automobile.

In the conventional control apparatus, when the automobile was in such condition that it was on the uphill load under the constant speed cruising control, the throttle valve was opened to maintain the target speed and the overdrive cruising prohibiting signal was outputted. At the moment when the automatic speed-changing device 12 shifts the transmission system downwardly as soon as the overdrive cruising prohibiting signal is received, there takes place a shock in the automobile due to the speed changing. Also, the automobile undergoes a shock due to the speed changing in the case that the automobile is on a flat road just after finishing the uphill road cruising, at which time the overdrive cruising prohibiting signal is removed and the automatic speed-changing device 12 changes again to the overdrive operation.

SUMMARY OF THE INVENTION

It is an object of the present invention to provide a constant speed cruising control apparatus capable of reducing a shock due to speed changing by the operation of an automatic speed-changing device on the basis of an overdrive cruising prohibiting signal provided from a control unit mounted on the automobile.

The foregoing and the other objects of the present invention have been attained by providing a constant speed cruising control apparatus for an automobile which comprises:

a cruising speed detecting means for detecting a cruising speed of an automobile;

an acceleration speed operating means for calculating an acceleration speed at predetermined time intervals on the basis of the output of the cruising speed detecting means;

an instruction data detecting means for detecting instruction data from a driver;

a target speed signal generating means for generating a target speed signal on the basis of the instruction data;

a speed deviation operating means for calculating the deviation between the cruising speed of the automobile and a target speed;

a driving force controlling means for control driving force of the automobile;

a controlled quantity operating means for receiving an acceleration signal from the acceleration speed operating means and a speed deviation signal from the speed deviation operating means so that a controlled quantity for controlling the driving force of the automobile is operated so as to coincide the cruising speed with the target speed;

an overdrive-switching means for generating an overdrive switching signal which permits or prohibits overdrive-cruising of the automobile;

an acceleration instruction detecting means for receiving the instruction data to detect the demand of acceleration by the driver;

an overdrive-controlling means for receiving the overdrive-switching signal, the speed deviation signal and the acceleration instruction signal and for generating a signal prohibiting the overdrive cruising of the automobile;

a time measuring means for measuring a first predetermined time from the time when the overdrive cruising prohibiting signal is generated, and for measuring a second predetermined time from the time when the overdrive cruising prohibiting signal is stopped;

a controlled quantity signal outputting means for outputting to the driving force controlling means a signal of a controlled quantity which is so corrected as to reduce the driving force for the automobile in the period between said first and second predetermined time; and an automatic speed-changing means with an overdrive controlling unit which receives the overdrive-switching signal and the overdrive controlling signal to automatically control the change of speed of the automobile.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
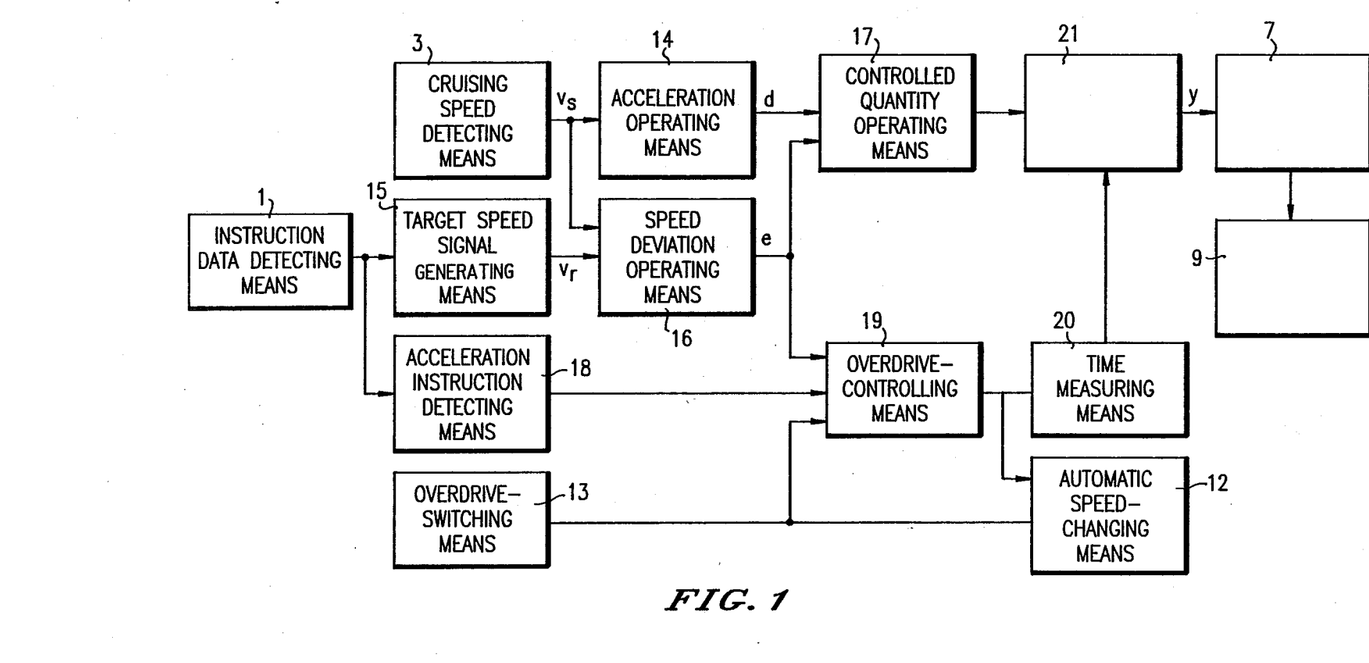
FIG. 1 is a block diagram showing an embodiment of the control apparatus according to the present invention.

Referring to the drawings, wherein the same reference numerals designate the same or corresponding parts throughout the several views, and more particularly to FIG. 1 thereof, there is shown a block diagram of an embodiment of the constant speed cruising control apparatus of the present invention. In FIG. 1, a reference numeral 1 designates an instruction data detecting means for detecting instruction data from a driver, a numeral 3 designates a cruising speed detecting means of detecting a cruising speed of an automobile, and a numeral 14 designates an acceleration speed operating means for calculating an acceleration speed at predetermined time intervals on the basis of cruising speed signals Vs from the cruising speed detecting means 3. A numeral 15 designates a target speed signal generating means which receives an instruction data signal from the instruction data detecting means 1 and generates a target speed signal Vr indicative of a target speed, a numeral 16 designates a speed deviation operating means for operating on the cruising speed signal Vs and the target speed signal Vr to produce a speed deviation signal $\epsilon(=Vr-Vs)$, a numeral 12 designates an automatic speed-changing means with an overdrive unit, and a numeral 13 designates an overdrive switching means to permit the cruising of the automobile in an overdriving condition or to prohibit it in the overdriving condition.

A numeral 17 designates a controlled quantity operating means which receives the accelaration speed signal $\alpha$ and the speed deviation signal is and which calculates a controlled quantity to control a driving force to the automobile so that the cruising speed Vs coinsides with the target speed Vr, a numeral 18 designates an acceleration instruction dectecting means for receiving the instruction data to detect the demand of acceleration by the driver, a numeral 19 designates an overdrive controlling means which is so adapted that it operates only when the overdrive switching means 13 permits the overdrive cruising; it outputs a signal for prohibiting the overdrive cruising of the automobile when the acceleration instruction signal is received, or the actual cruising speed is at least a predetermined value lower than the target speed in the determination of the speed deviation signal $\epsilon$, and it stops generation of the overdrive cruising prohibiting signal when no further acceleration instruction signal is received and the actual cruising speed is more than a predetermined value as high as the target speed in the determination of the value of the speed deviation signal $\epsilon$.

A time measuring means 20 measures a time from the input of the overdrive cruising prohibiting signal to a first predetermined time, and measures a time from the stop of inputting the overdrive cruising prohibiting signal to a second predetermined time. A numeral 21 designates a controlled quantity signal outputting means for outputting a signal to reduce the driving force to the automobile irrespective of the value of the controlled quantity when the first and second predetermined times are not still lapsed, and in the condition other than the above-mentioned, for outputting a signal indicative of a normally controlled quantity y, and a numeral 7 designates a throttle valve driving means for driving the throttle valve 9 to adjust the output of the engine on the basis of the controlled quantity y.

Figure 2:
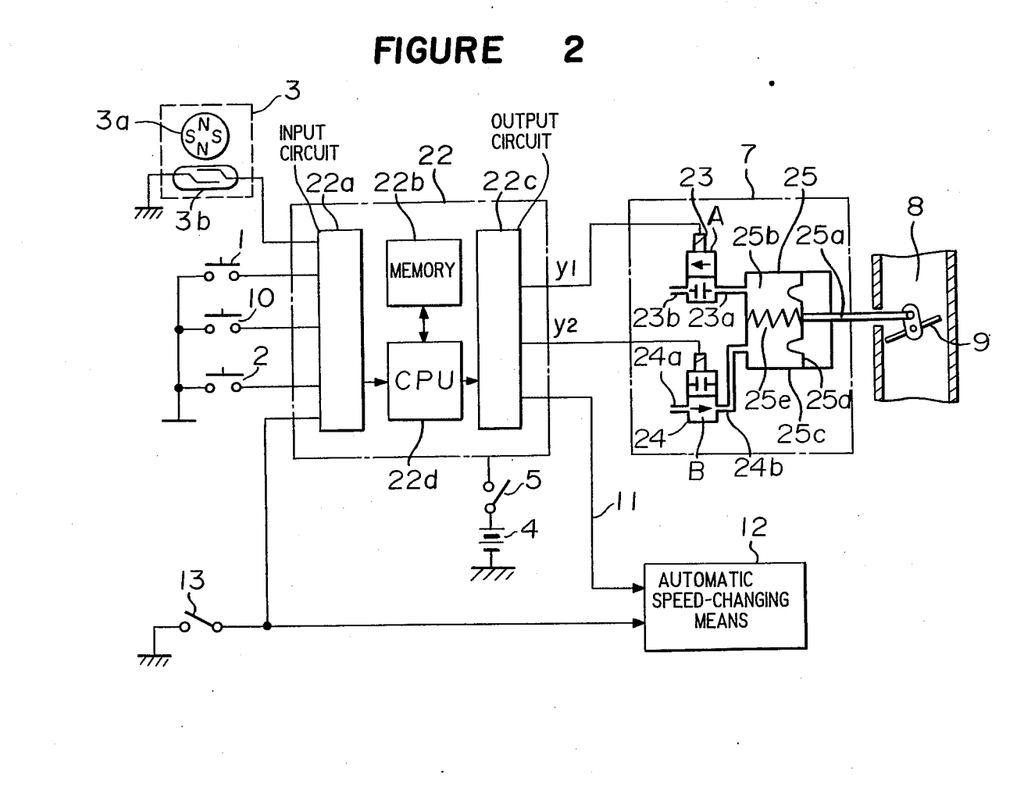
FIG. 2 is a diagram showing the control apparatus as in FIG. 1 in more detail.

FIG. 2 is a diagram showing the general construction of the control apparatus of the present invention. In FIG. 2, a reference numeral 1 designates a set switch as an instruction data detecting means, a numeral 2 designates a cancel switch, a numeral 3 designates a car speed sensor as a cruising speed detecting means, a numeral 4 designates a battery, a numeral 5 designates a main switch, a numeral 8 designates an intake air conduit, a numeral 9 designates a throttle valve, a numeral 10 designates an accleration switch, a numeral 11 designates an overdrive cruising prohibiting signal, a numeral 12 designates an automatic speed-changing device with an overdrive unit, and a numeral 13 designates a change-over switch.

A numeral 22 designates a microcomputer corresponding to the control unit 6 in FIG. 1, which comprises an input circuit 22a, a memory 22b, an output circuit 22c and a CPU 22d. The input circuit 22a is to process input signals from the set switch 1, the cancel switch 2, the car speed sensor 3, the acceleration switch 10 and the changing-over switch 13. The memory 22d comprises an ROM in which a instruction program is stored and an RAM. The CPU 22d is operable in accordance with the instruction program in the memory 22b and processes and calculates the signals from the input circuit 22a so that an output signal is supplied to the output circuit 22c. The output circuit 22c outputs a signal in accordance with the instruction of the CPU 22d.

A numeral 23 designates a first electromagnetic valve controlled by control signal y1 from the microcomputer 22. The first electromagnetic valve 23 has an output tube 23b communicated with a negative pressure source (not shown) and an input tube 23a so that when the control signal y1 is in an "L" level, the valve is brought into a non-communicating state, and when it is in an "H" level, it permits communication in the direction indicated by an arrow mark A. A numeral 24 designates a second electromagnetic valve controlled by a control signal y2, which has an input tube 24a opened to the atmosphere and an output tube 24b so that when the control signal by 2 is in an "L" level, it permits communication in the direction indicated by an arrow mark B, and when the signal is in an "H" level, the valve is brought into a non-communicating state.

A numeral 25 designates a diaphragm device for driving the throttle valve 9, which comprises a casing 25c for defining an air chamber 25b therein, the air chamber 25b being communicated with both the input tube 23a and the output tube 24b, a diaphragm 25d for dividing the interior of the casing 25c into the air chamber 25b and a space, a wire 25a having one end connected to the diaphragm 25d and the other end connected to the throttle valve 9 and a spring 25e interposed between the diaphragm 25d and the inner surface of the casing 25c to push the diaphragm 25d on the right hand in FIG. 2. The diaphragm device 25 constitutes a throttle valve driving means 7 in association with the electromagnetic valves 23, 24. The throttle valve driving means 7 provides three kinds of operation mode as shown in Table 1.

TABLE 1

| Operation mode | y1 | y2 | Throttle valve |
| --- | --- | --- | --- |
| Acceleration mode | H | H | open |
| Deceleration mode | L | L | close |
| Holding mode | L | H | constant |

Namely, when the control signals y1, y2 are both in the "H" level, the first electromagnetic valve 23 is communicated, while the second electromagnetic valve 24 is not communicated, with the result that the air chamber 25b of the diaphragm device 25 is communicated only to the negative source, and the diaphragm 25d is moved on the left hand to open the throttle valve 9. Accordingly, the automobile is accelerated and the throttle valve driving means 7 is in the acceleration mode.

When the control signals y1, y2 are both in the "L" level, the first electromagnetic valve 23 is not communicated, while the second electromagnetic valve 24 is communicated with the result that the air chamber 25b is communicated only to the atmosphere, whereby the diaphragm 25d is moved on the right hand in FIG. 2 by the action of the spring 25e. Accordingly, the throttle valve 9 is closed and the throttle valve driving means 7 is in the deceleration mode.

When the control signals y1, y2 are respectively in the "L" level and the "H" level, the air chamber 24b is brought to a non-communicating state with both the atmosphere and the negative pressure source. Accordingly, the diaphragm 25d is fixed in the where the control signals y1, y2 are provided. The throttle valve 9 is also fixed to be in the holding mode.

Figure 3A:
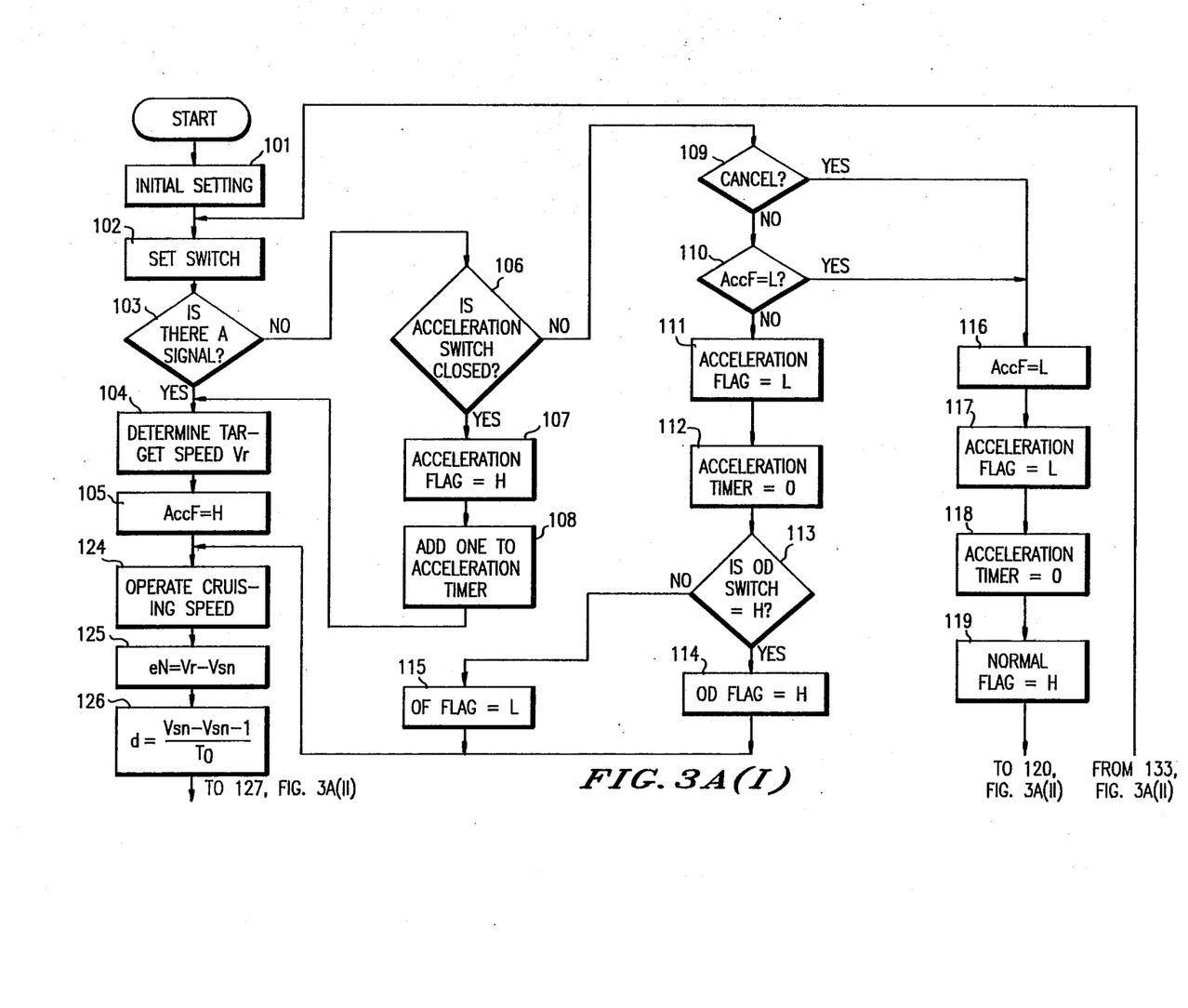
FIGS. 3a-3d are flow charts showing an example of a constant speed cruising control for an automobile by a microcomputer used for the present invention.
Figure 3C:
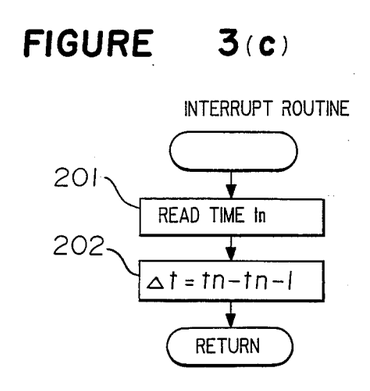
Figure 4:
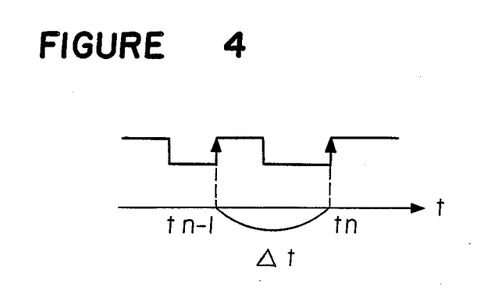
FIG. 4 is a diagram showing a signal outputted from a car sensor for the present invention.

In the following, the operation of the control apparatus as shown in FIG. 2 will be described. FIG. 3 is a flow chart showing the operations of the microcomputer 22. By operating the main switch 5 to feed an electric power to the microcomputer 22, it starts operations. At first, a main routine as in FIG. 3a is executed. On the other hand, a signal having a pulse train as shown in FIG. 4 having a frequency in proportion to a cruising speed is generated from the car sensor 3 by the pulse signal, an interrupt routine processing program as shown in FIG. 3c is run by the microcomputer 22. Namely, at each rising part in the pulse train signal, the interrupt routine as shown in FIG. 3c is run. At Step 201, the time tn at which a rising part is input is read by a timer (not shown), and at Step 202, the time difference $\Delta t$ ($=tn-tn-1$) from the present rising time tn to the previous rising time $tn-1$, i.e. a frequency, is obtained. Then, the sequential step is returned to the main routine. Thus, by obtaining the frequency of the pulse train signal, the actual cruising speed of the automobile is calculated by the reciprocal value of the frequency.

In the main routine, initial setting or resetting is carried out at Step 101. At Step 102, whether or not a power appears at the set switch is examined. Then, judgment is made as to whether or not there is a signal from the set switch 1 at Step 103. In the case of "Yes", the sequential step goes to Step 104 at which a target speed signal Vr is determined on the basis of the frequency $\Delta t$ of the pulse single which is obtained by the interrupt routine as in FIG. 3c. At Step 105, a flag ACCF indicating constant speed cruising condition is changed to an "H" level.

When there is no signal at the set switch 1, determination is made as to whether or not the acceleration switch 10 is closed at Step 106. When "Yes", an acceleration flag is changed to "H" at Step 107, and then, a numerical value 1 is added to an acceleration timer at Step 108.

If the acceleration switch 10 is not closed, determination is made as to whether or not the cancel switch 2 is closed at Step 109. If not, then determination is made as to whether or not the automobile runs at constant cruising speed at Step 110. When the automobile runs at the constant cruising speed, an acceleration flag is changed to "L" at Step 111. At Step 112, an acceleration timer is made zero. Then, determination is made as to whether or not the overdrive switch 13 is actuated at Step 113.

In FIG. 2, when the switch 13 is in an off-state and it is in the condition permitting overdrive cruising, an overdrive permitting flag is changed to "H" at Step 114. On the other hand, when the switch 13 is in an on-state, the overdrive permitting flag is changed to "L" at Step 115.

When the automobile runs in a non-constant speed cruising condition, a constant speed cruising flag is changed to "L" at Step 116; an acceleration flag is changed to "L" at Step 117; an acceleration timer is made zero at Step 118; a normal control flag is changed to "H" at Step 119; an overdrive prohibiting flag is changed to "L" at Step 120; an overdrive cruising prohibiting signal is cancelled at Step 121; a controlled quantity signal outputting flag is changed to "L" at Step 122 and cancel signals y1=L and Y2=L are outputted at Step 123, the above-mentioned Steps being carried out in this order.

At Step 124, a cruising speed is obtained by the following equation by taking the frequency Δt of the latest pulse signal which is obtained by the interrupt routine in FIG. 3c;

$$V = \frac{N}{\Delta t}$$

where N is a constant for converting into speed.

In order to reduce noise components, the value of cruising speed Vsn which is smoothed by the following equation is used for controlling.

$$Vsn = aVsn - 1 + bVn$$

where symbols a and b are respectively constants representing smoothing characteristics; n is a present value and n−1 is the previous value.

At Step 125, the speed deviation $\epsilon$ between the target speed Vr and the actual cruising speed Vsn is obtained by using the following equation.

$$\epsilon n = Vr - Vsn$$

At Step 126, an acceleration speed for each predetermined time to concerning the cruising speed Vs is obtained by using the following equation.

$$\alpha = \frac{Vsn - Vsn - 1}{To}$$

At Step 127, determination is made as to whether or not there is a flag indicating permission of overdrive cruising. When the flag shows "L", i.e. it shows prohibition of overdrive cruising, a normal cruising flag is changed to "H" at Step 128. At Step 129, the controlled quantity signal outputting flag is examined. If the flag shows no signal output, a controlled quantity for driving the throttle valve is calculated at Step 130. when of the controlled quantity is calculated, the following equation may be used by utilizing a speed deviation $\epsilon n$ and an acceleration speed $\alpha n$.

$$T = K1\epsilon n + K2 \alpha n$$

where K1, K2 are constants.

At Step 131, the output level of each of the control signals y1, y2 is obtained from the sign of the controlled quantity signal output time T in Table 2. The output time T is also set in a timer (not shown).

TABLE 2

| T | Control mode | y1 | y2 |
|---|---|---|---|
| Positive | Acceleration mode | H | H |
| Negative | Deceleration mode | L | L |
| 0 | Holding mode | L | H |

At Step 132, a flag indicating the output of a controlling signal is changed to "H". At Step 133, time is counted until the predetermined time period T0 is lapsed. After the predetermined time period, the sequential step is returned to Step 102 so that the above-mentioned sequential steps are repeated in the above-mentioned order.

On the other hand, when the control signal is outputted, a separate timer is actuated to count a time in which a controlling signal is outputted. When the value of the time counted by the timer coincides with the controlling signal outputting time T, then the sequential step goes to a timer interruption routine as shown in FIG. 3d. In FIG. 3d, the control mode is changed to the holding mode at Step 301, and a control signal outputting flag is changed to "L" at Step 302. Then, the sequential step is returned to the main routine.

At Step 127, when the overdrive permitting flag is in "H", which implies to allow the overdrive cruising, it is necessary to carry out control at the time of changing the speed during the overdrive cruising.

Step 134 shows generally an overdrive control routine in which overdrive (hereinbelow referred to as OD) control is carried out by detecting a predetermined time after the overdrive cruising is prohibited, or a predetermined time after the overdrive cruising is restored. The detailed of the OD control is shown in FIG. 3b.

Figure 3B:
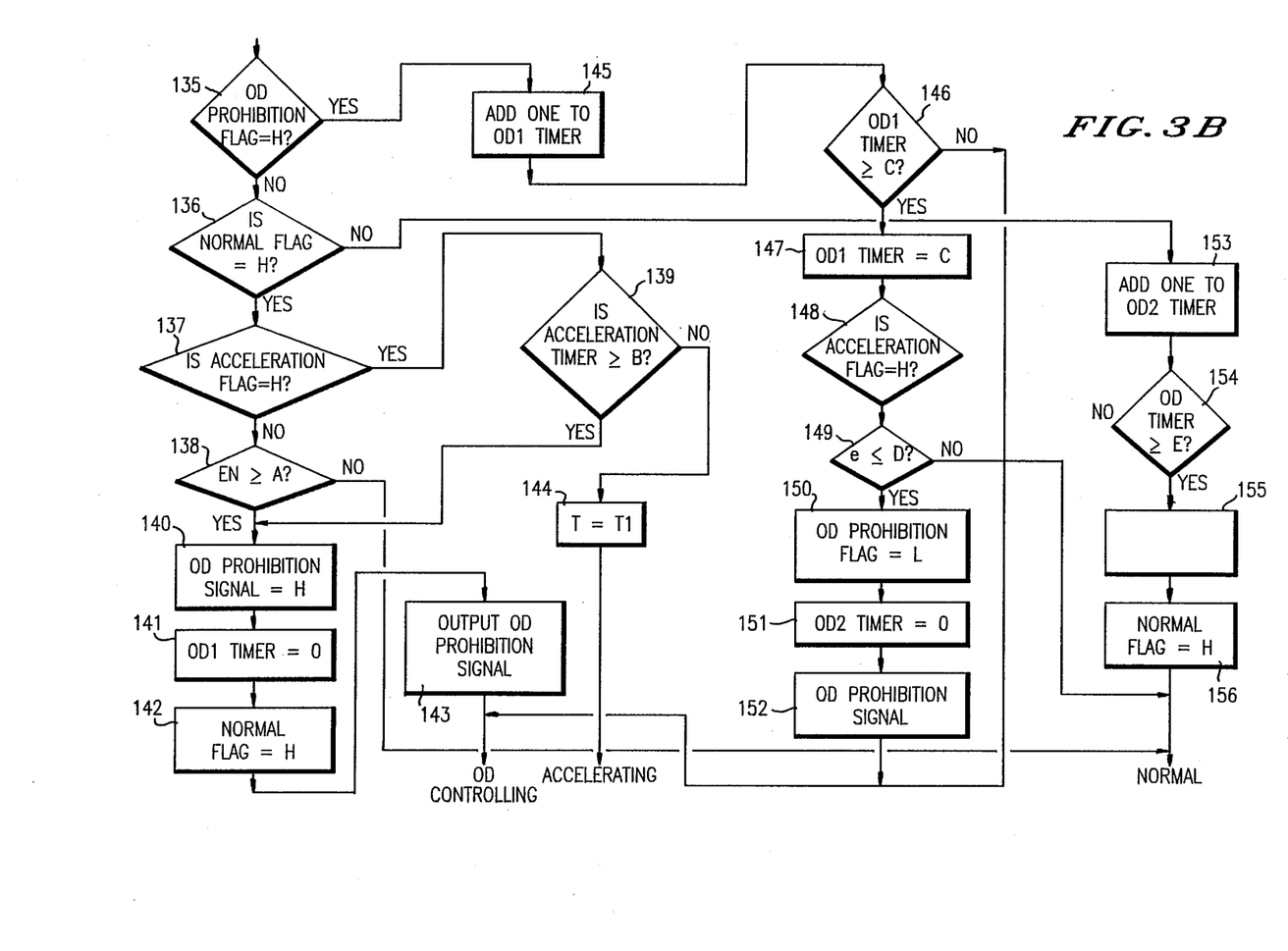
Figure 3D:
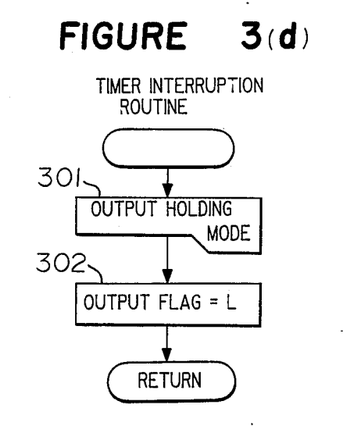

In FIG. 3b, determination is made as to whether or not a flag indicating that the OD cruising is prohibited is in "H" at Step 135. If it is "No", then, determination is made as to whether or not a flag indicating that controlled quantity is normally operated is in an "H" at Step 136. If it is "Yes", determination is made whether or not a flag indicating the automobile being accelerated is an "H" at Step 137. If it is "No", then, determination is made as to whether or not the speed deviation $\epsilon n$ reaches a predetermined value A at Step 138. When the speed deviation $\epsilon n \geq A$, the actual cruising speed Vs is at least A lower than the target speed Vr. If the flag of acceleration is in an "H" state at Step 137, determination is made as to whether or not the value of the acceleration timer is higher than a predetermined time B. When the condition of the acceleration timer is $\geq B$, the automobile is continued to be accelerated.

At Step 140, an OD prohibiting flag which shows the OD cruising is prohibited is changed to "H". Then, an OD1 timer is made zero at Step 141; a flag indicating normal controlled quantity operating condition is changed to "L" at Step 142, and a signal for prohibiting the OD cruising is output to the automatic speed-changing device 12 at Step 143. On the other hand, during accelerating operations, the controlled quantity signals outputting time T is replaced by a constant value T1 at Step 144. Then, the sequential Step goes to an acceleration routine.

At Step 135, when the OD prohibiting flag is in "H", then, Step 145 is taken to prohibit the OD cruising, and a numerical value 1 is added to the OD1 timer which counts time. At Step 146, determination is made as to whether or not the OD1 timer counts a predetermined time C. When the counting is not finished, then the sequential step goes to an OD control routine. When the counting of the predetermined time C is finished, the value in the OD1 timer is changed to C at Step 147. At Step 148, determination is made as to whether or not the automobile is accelerated. If yes, then, Step 149 is taken at which determination is made as to whether or not the speed deviation n is lower than a predetermined value D. When $n>D$ and $D<0$, the sequential step goes to a normal control routine.

At Step 150, the OD cruising permitting condition is again taken, and the OD prohibiting flag is changed to "L". Then, an OD2 timer is made zero at Step 151, and the OD cruising prohibiting signal to the automatic speed-changing device 12 is removed at Step 152, and the OD control routine is taken.

When Step 136 shows no normal controlled quantity operating condition, the OD cruising is allowed and a numerical value of "1" is added to the OD2 timer which counts a predetermined time at Step 153. At Step 154, determination is made as to whether or not the OD2 timer counts a predetermined time E. If not, the OD control routine is taken. On the other hand, if yes, the value of time E is put in the OD2 timer at Step 155. At Step 156, the flag indicating the normal controlled quantity operating condition is changed to "H", and the normal routine is taken.

Figure 5:
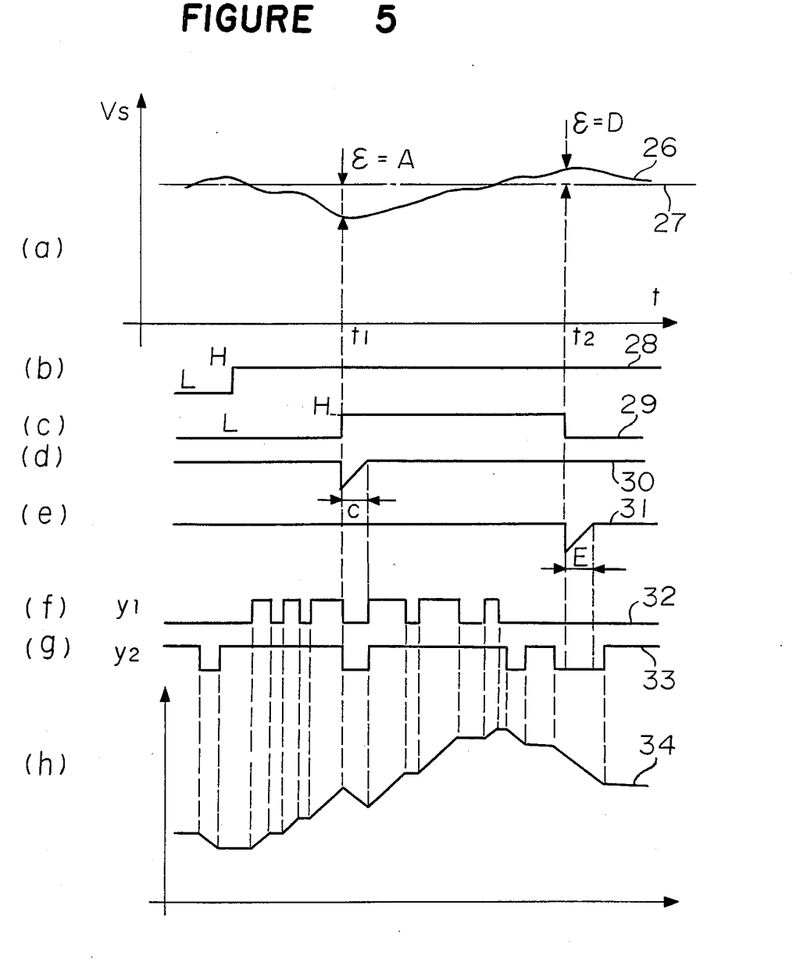
FIG. 5 is a time chart for the constant speed cruising of the present invention.

FIG. 5 is a timing chart showing the operations of the control apparatus according to the present invention.

Assuming that the cruising speed varies as indicated by a line 26 and the target speed is represented by a line 27 as shown in FIG. 5a. A signal from the OD switch 13 is shown by a line 28 in FIG. 5b. At a time point t1 where the cruising speed Vs is lower than the target speed Vr by a value A, an OD cruising prohibiting signal 29 is outputted (FIG. 5c). At the same time, the OD timer starts to count from zero. The control signals y1, y2 become an "L" state as shown in FIGS. 5f and 5g until the predetermined time C is lapsed (FIG. 5d). Then, a normal control signal is outputted and the OD cruising prohibiting signal is removed at a time point t2 where the cruising speed Vs is higher than the target speed Vr by a value D. As soon as the signal is removed, the OD2 timer starts to count from zero as shown in FIG. 5e and the control signals y1, y2 become an "L" state until the predetermined time E is lapsed. FIG. 5h shows the variation of the degree of opening of the throttle valve.

Thus, in contrast with the conventional control apparatus in which measures as to soften a shock to an automobile caused at the time of changing the speed of the automobile were not taken even though it had the OD cruising prohibiting means, the above-mentioned embodiment of the present invention is so adapted to soften a shock at the speed changing by closing the throttle valve for a predetermined time by a control signal.

In the above-mentioned embodiment, the throttle valve driving means 7 is constituted by the electromagnetic valves 23, 24 and the diaphragm device 25. However, a motor driven tape actuator as used in the conventional control apparatus which is shown as in FIG. 6 may be used.

Thus, in accordance with the present invention, the throttle valve is driven toward the closing direction for a predetermined time to soften a shock caused when the cruising speed of an automobile is changed during constant speed cruising. Accordingly, more comfortable cruising or the automobile can be obtained.

Obviously, numerous modifications and variations of the present invention are possible in light of the above teachings. It is therefore to be understood that within the scope of the appended claims, the invention may be practiced otherwise than as specifically described herein.

What is claimed is:

1. A constant speed cruising control apparatus for an automobile which comprises:
    a cruising speed detecting means for detecting a cruising speed of an automobile;
    an acceleration speed operating means for calculating an acceleration speed at predetermined time intervals on the basis of the output of said cruising speed detecting means;
    an instruction data detecting means for detecting instruction data from a driver;
    a target speed signal generating means for generating a target speed signal on the basis of said instruction data;
    a speed deviation operating means for calculating the deviation between the cruising speed of the automobile and a target speed;
    a driving force controlling means for controlling the driving force of said automobile;
    a controlled quantity operating means for receiving an acceleration signal from said acceleration speed operating means and a speed deviation signal from said speed deviation operating means so that a controlled quantity for controlling the driving force of the automobile is operated so as to coincide the cruising speed with the target speed;
    an overdrive-switching means for generating an overdrive switching signal which permits or prohibits overdrive-cruising of the automobile;
    an acceleration instruction detecting means for receiving said instruction data to detect the demand of acceleration by said driver;
    an overdrive-controlling means for receiving said overdrive-switching signal and said speed deviation signal and said acceleration instruction signal and for generating an overdrive controlling signal prohibiting the overdrive cruising of the automobile;
    a time measuring means for measuring a first predetermined time from the time when said overdrive cruising prohibiting signal is generated, and for measuring a second predetermined time from the time when said overdrive cruising prohibiting signal is stopped;
    a controlled quantity signal outputting means for outputting to said drive force controlling means a signal of a controlled quantity which is so corrected as to reduce the driving force for the automobile during said first and second predetermined times; and an automatic speed-changing means which receives said overdrive-switching signal and said overdrive controlling signal to automatically control the change of speed of the automobile.

2. The constant speed cruising control apparatus according to claim 1, wherein said overdrive controlling means comprises means for operating only when said overdrive switching means permits the overdrive cruising, means for outputting a signal for prohibiting the overdrive cruising of the automobile when said acceleration instruction signal is received or said actual cruising speed is at least a predetermined value lower than said target speed in the determination of the value of said speed deviation signal; means for stopping generation of said overdrive cruising prohibiting signal when a further acceleration instruction signal is received and said actual cruising speed is more than a predetermined value as high as said target speed in the determination of the value of said speed deviations signal, and means for stopping generation of said overdrive cruising prohibiting signal when said overdrive switching signal prohibits the overdrive cruising of the automobile; and said controlled quantity outputting means comprises means for outputting a signal to reduce the driving force for the automobile irrespective of said controlled quantity when said first and second periods of time are not lapsed, and means for outputting said signal indicative of the controlled quantity when said first and second periods of time are lapsed.

* * * * *